US005532982A

United States Patent [19]

Béguin et al.

[11] Patent Number: 5,532,982

[45] Date of Patent: Jul. 2, 1996

[54] COUPLING DEVICE BETWEEN A SOURCE OF MECHANICAL ENERGY AND AN ELECTRICAL ENERGY GENERATOR IN A TIMEPIECE

[75] Inventors: Jean-Luc Béguin, Cormondrèche; Pierre Haefeli, Saules, both of Switzerland

[73] Assignee: Eta SA Fabriques d'Ebauches, Grenchen, Switzerland

[21] Appl. No.: 429,574

[22] Filed: Apr. 27, 1995

[30] Foreign Application Priority Data

May 4, 1994 [CH] Switzerland .......................... 01398/94

[51] Int. Cl.[6] ............................ G04B 1/00; H01M 10/46

[52] U.S. Cl. ............................... 368/64; 368/204; 320/21

[58] Field of Search .............................. 368/64, 76, 80, 368/203–204; 320/2, 21, 41, 42, 61; 322/1, 3, 4, 10

[56] References Cited

U.S. PATENT DOCUMENTS 4,644,246 2/1987 Knapen .................................... 320/21
4,910,720 3/1990 Ray et al. .............................. 368/148
4,939,707 7/1990 Nagao ...................................... 368/64
5,278,806 1/1994 Affolter .................................. 368/204

FOREIGN PATENT DOCUMENTS 0170303 2/1986 European Pat. Off. .
9204662 3/1992 WIPO .

OTHER PUBLICATIONS

Patent Abstracts of Japan vol. 12 No. 383 (P–770), 13 Oct. 1988 & JP-A-63 128286 (Seiko Epson Corp).

Horological Journal, Bd. 132, No. 4, Oct. 1989 Upton GB, pp. 124–125, XP 000054948 A. G. Randall "Technical Report–The Jean d'Eve Samara".

*Primary Examiner*—Vit W. Miska
*Attorney, Agent, or Firm*—Griffin, Butler, Whisenhunt & Kurtossy

[57] ABSTRACT

A coupling device (1) between a source of mechanical energy (2) and a generator of electrical energy (3) comprises an arbor (4) driven by said source of mechanical energy, a cylindrical element (5) fixedly and coaxially mounted on the arbor, a tube (6) surmounting said cylindrical element arranged to rotate freely about said arbor and drive said generator. A helical spring (7) is friction-fitted on the cylindrical element and on the tube by its first turns (8) and last turns (9) respectively. A space (10) is provided between said tube and cylindrical element and the central turns (11) of the spring (7).

5 Claims, 2 Drawing Sheets

Figure 1:
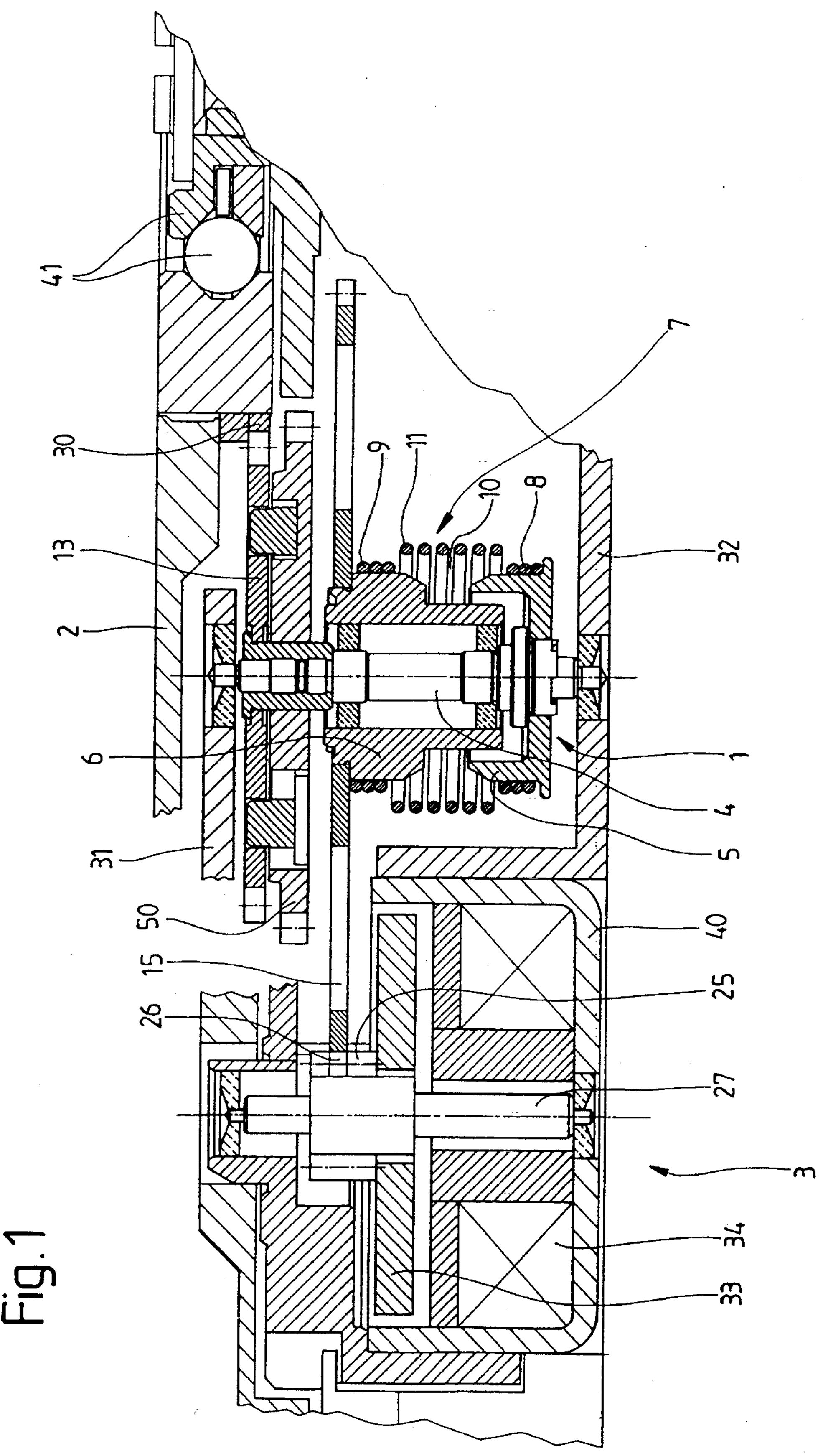

COUPLING DEVICE BETWEEN A SOURCE OF MECHANICAL ENERGY AND AN ELECTRICAL ENERGY GENERATOR IN A TIMEPIECE

The present invention relates to a coupling device between a source of mechanical energy and a generator of electrical energy in a timepiece comprising an arbor driven by said source of mechanical energy and a cylindrical element fixedly and coaxially mounted on the arbor.

Such a coupling device is known from U.S. Pat. No. 4,644,246 for supplying current to, in particular, a timepiece. The latter comprises an a.c. generator, a rechargeable battery and a charging system interposed between the generator and the battery, the generator comprising a multipolar rotor carrying permanent magnets and a stator provided with windings supplying the a.c. current. An eccentric mass drives the rotor. The rotor, the stator and the mass are coaxially mounted. The coupling between the mass, i.e. the source of mechanical energy, and the rotor of the generator of electrical energy consists, at least in one described embodiment, of a balance-spring having one of its ends attached to a cylindrical element forming part of the pivotal arbor of the eccentric mass and its other end attached to a cage carrying the generator's rotor. When at rest, the rotor is magnetically restrained by the stator, which constitutes a certain positioning torque. When the mass starts to turn, it tensions or winds the balance-spring around the cylindrical element until the energy that has been accumulated by the spring exceeds the energy for positioning the rotor in relation to the stator. From then on, the rotor is released and pivoted at a fast speed until exhaustion of the kinematic energy that is stored by the spring, the generator then producing a high electromotive force to charge the battery.

However ingenious it may be, the above proposed arrangement suffers from several drawbacks. Firstly, the system is incessantly subjected to repeated shocks. The balance-spring, which is welded on the one hand to the cylindrical element and on the other hand to the cage that bears the generator's rotor, is put to contribution both at the beginning of a spring winding action (abrupt starting of the eccentric mass) and at the end of an unwinding action of the same spring (abrupt stoppage of the rotor when the spring has fully unwound). These phenomena cause intense strain on the inner and outer pinning-points of the balance-spring, leading to rapid breakage. Moreover, it has been found that once the energy stored by the spring has been fully returned to the rotor, i.e. when the spring is fully unwound, the rotor abruptly stops turning, whereas it could carry on turning under its momentum and thus restore its own kinematic energy.

To overcome the above drawbacks, the present invention is characterized in that the said cylindrical element is surmounted by a tube mounted for free rotation about said arbor and arranged to drive said generator, a helical spring being mounted with a friction-tight fit on the cylindrical element and on the tube by its first turns and last turns respectively, a space being provided between said tube and cylindrical element and the middle turns of said spring.

Figure 2:
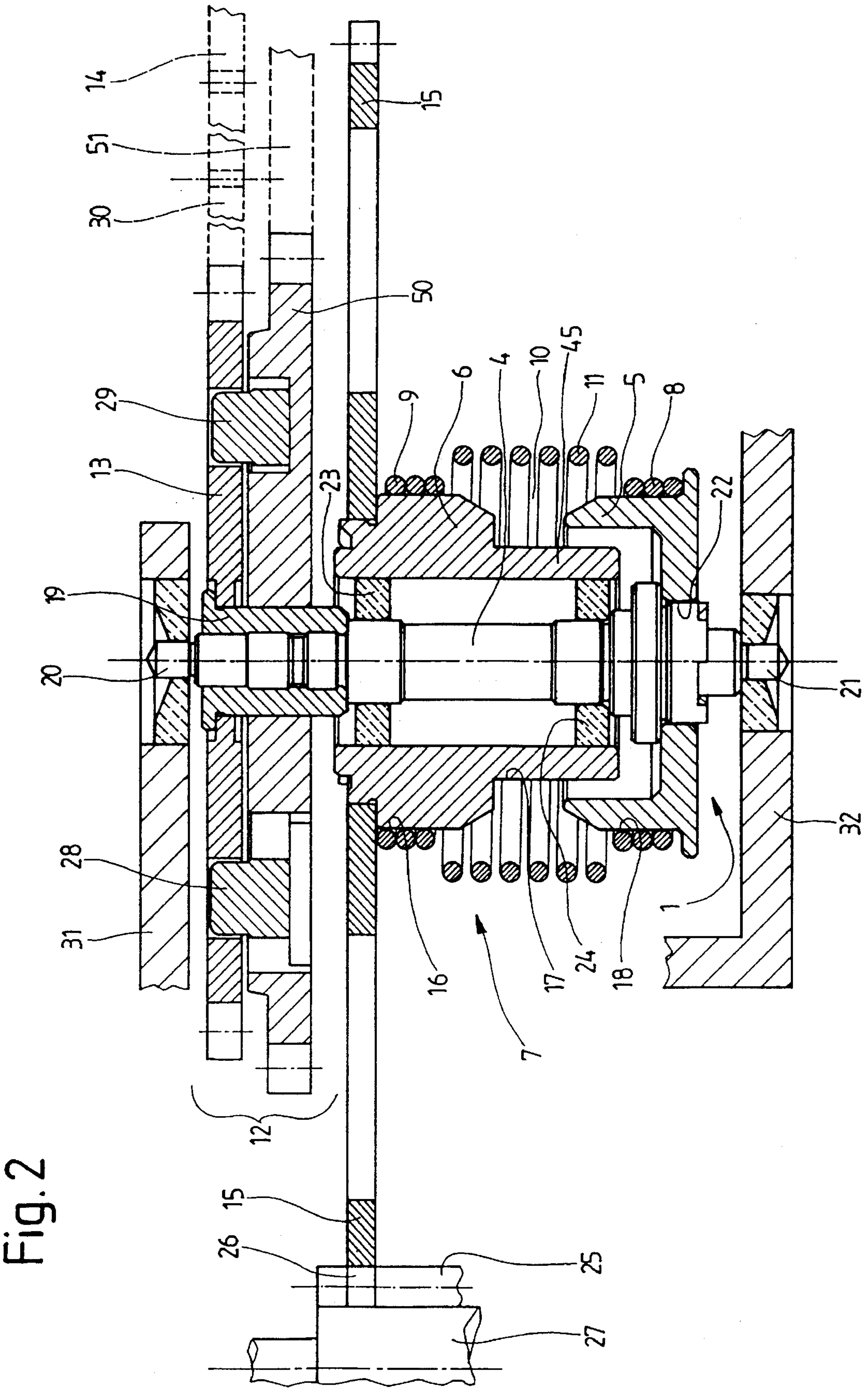

The invention will now be understood from a reading of the following description given by way of example and which is illustrated by the drawings in which:

FIG. 1 is a partial section in a mechanism using the coupling device according to the invention, and FIG. 2 is a section of the actual coupling device according to one embodiment of the invention.

The coupling device 1 according to the invention lies between a mechanical energy source 2 and an electrical energy generator 3 as may be seen in FIG. 1. In the chosen example, the mechanical energy source 2 is an oscillating eccentric mass of the kind found in self-winding mechanical watches. The invention is not of course limited to this particular mass, but could be extended to other sources of mechanical energy. As for the electrical energy generator 3, it consists of a magnetized rotor 33 borne by an arbor 27. When rotating, the rotor produces magnetic flux variations on a winding 4 arranged in a flux return casing 40. The casing is secured in a plate 32 of the watch. The a.c. current collected at the terminals of the winding 34 is intended to charge an accumulator of the gold cap type for example, via a conventional rectifier. In turn, the accumulator supplies a quartz oscillator, a frequency divider and a stepping motor as is well known in electronic watches.

In self-winding timepieces the oscillating mass has a bidirectional motion which needs to be made unidirectional to wind up a barrel spring. Generally this oscillating mass pivots at the center of the movement, coaxially with the hands, and is supported by a ball bearing of which a part 41 is shown in FIG. 1. To this mass is secured a wheel 30 whose teeth mesh with a first ratchet wheel 13. The wheel 30 also meshes with a second ratchet wheel 14 as outlined in broken lines in FIG. 2. The first ratchet wheel 13 (see FIGS. 1 and 2) cooperates with a first driving disc 50 force-fitted on an arbor 4 driving the coupling device 1 according to the invention. The second ratchet wheel 14 (outlined in broken lines in FIG. 2) cooperates with a second driving disc 51 directly meshing with the first disc 50. In this system, when the mass driving the wheel 30 rotates in one direction, it is the first ratchet wheel 13 that drives the first disc 50 clockwise, whereas if this mass rotates in the other direction, it is the second ratchet wheel 14 that drives the second disc 51 anti-clockwise, this second disc 51 in turn causing the first disc 50 to turn clockwise. The arbor 4 thus always turns in the same direction whatever may be the direction of rotation of mass 2. This system is well known in the state of the art and a reader wishing to know more would benefit from reading B. Humbert's book entitled "La montre suisse à remontage automatique" ("The Swiss Self-winding Watch") published by Edition Scriptar, Lausanne 1955, pages 198 to 202.

Reverting now to the actual invention, illustrated on a larger scale in FIG. 2, it will be observed that a cylindrical element 5 is fixedly and coaxially mounted, e.g. force-fitted, on the arbor 4 which is driven as explained earlier. The cylindrical element 5 is surmounted by a tube 6 arranged to rotate freely about the arbor 4. The freedom of tube 6 is provided by two jewels 23 and 24 force-fitted in the tube and whose central hole is freely fitted on the arbor 4 which is arranged to drive the generator 3 (FIG. 1). As clearly shown in FIG. 2, a helical spring 7 is mounted with a friction-tight fit on the cylindrical element 5 and on the tube 6 by its first turns 8 and last turns 9 respectively. FIG. 2 further shows that a space 10 is provided between the tube and the cylindrical element, on the one hand, and the central turns 11 of spring 7, on the other.

In the example illustrated in FIG. 2 the generator is driven by a wheel 15 having a large diameter. This wheel is solid with tube 6. The teeth 26 of wheel 15 mesh with a pinion 25 borne by the arbor 27 of generator 3. As may be seen in this same Figure, the arbor 4 of the coupling device pivots between the plate 32 of the movement and a bridge 31 borne by the latter. In fact, the coupling device operates as follows:

When the arbor 4 rotates (unidirectionally as mentioned earlier), it draws with it the first turns 8 of spring 7, which are wrapped round the cylindrical element 5 with a friction-tight fit and wound in a direction tending to tighten this fit still further, causing them to rotate therewith. As the tube 6 is restrained from rotating by the torque for magnetically positioning generator 3, the last turns 9 of spring 7 that are wrapped round the tube with a friction-tight fit tighten still further around the latter, thereby tensioning the spring 7 in the region of its central turns 11 which contract and reduce their diameter hence to accumulate the energy developed by the source of mechanical energy issuing from the oscillating mass. As soon as the torque stored by the spring 7 exceeds the torque for positioning the generator 3, the latter starts to rotate at great speed, being driven by the wheel 15 that is solid with the tube 6. The generator will carry on rotating until the potential energy stored in spring 7 is exhausted, whereupon it will still carry on rotating for a few more turns since, after this exhaustion, the spring 7 has a tendency to slip in the region of the first and last turns 8 and 9, thereby enabling the generator 3 still to release the kinetic energy picked up by its rotor 33.

It will become apparent that this device not only is exempt from shocks (the spring 7 is not fixed to anything) thus imparting thereto a long life, but is furthermore able to restore the energy that it receives almost entirely since efficiencies of about 98% have been measured. It is in fact a highly advantageous device that enables, on the one hand, a coupling action and an uncoupling action between a source of mechanical energy and a generator of electrical energy and, on the other hand, a virtually full restitution of the energy stored by the mechanical energy source.

The proposed device also makes it possible to transform the relatively slow speed of the mechanical energy source (about 240 rpm) into a very fast speed (about 15000 rpm), something that is favourable to the overall efficiency of the generator. It should be noted that the large increase in speed generated by the ratio between the number of teeth on the pinion 25 of the generator's arbor and the number of teeth 26 on the large wheel that forms a unit with the device according to the invention, contributes in a large measure to this high speed. It should also be noted that the generator is always driven at the same speed as it is only released when its positioning torque is less than the mechanical torque stored by the spring. This has the advantage of ensuring a constant efficiency as the generator always restores the same amount of energy.

As can be seen in FIG. 2, which illustrates an embodiment of the invention, the helical spring has central turns 11 having a diameter greater than the first and last turns 8 and 9, which first and last turns have a substantially constant diameter. As a result the outer diameter 16 of tube 6 and the outer diameter 18 of the cylindrical element 5 are also substantially the same. In this way the manner of making the spring 7 is simplified.

Still in FIG. 2, it will be observed that the tube 6 is stepped with at least two different diameters, the first, 16, receiving the last turns 9 of spring 7 and the second, 17, which is smaller, penetrating at least partially inside the cylindrical element 5 which is shaped like a cup, the outer diameter 18 of the said cup receiving the first turns 8 of spring 7. In this stepped arrangement, it would be possible to imagine a spring 7 having a constant diameter from top to bottom since a space 10 would always be provided between the lower portion 45 of tube 6 and the central turns 11 of spring 7.

What we claim is:

1. A device for coupling a source of mechanical energy and a generator of electrical energy in a timepiece, comprising an arbor driveable by said source of mechanical energy and a cylindrical element fixedly and coaxially mounted on said arbor, a tube surmounting said cylindrical element, said tube being mounted for free rotation about said arbor and arranged to drive said generator, and a helical spring mounted with a friction-tight fit on the cylindrical element and on the tube by its first turns and last turns respectively, a space being provided between said tube and cylindrical element and the central turns of said spring.

2. A device as in claim 1, wherein the helical spring has central turns having a diameter greater than the diameter of said first turns and last turns, said first and last turns having a substantially equal diameter.

3. A device as in claim 1, wherein the source of mechanical energy is an oscillatory mass arranged to drive the arbor in a unidirectional direction by means of a system including ratchet wheels.

4. A device as in claim 1, wherein the electrical energy generator is driven by a wheel of large diameter solid with said tube.

5. A device as in claim 1, wherein the tube has at least two stepped portions having different diameters, the first portion receiving the last turns of the spring and the second portion, of smaller diameter, penetrating at least partially into the cylindrical element which is shaped like a cup, the outside of said cup receiving the first turns of said spring.

* * * * *